United States Patent [19]
Gilde, Jr.

[11] 4,184,789
[45] Jan. 22, 1980

[54] WASTEWATER TREATMENT SYSTEM

[75] Inventor: Louis C. Gilde, Jr., Moorestown, N.J.

[73] Assignee: Campbell Soup Company, Camden, N.J.

[21] Appl. No.: 936,739

[22] Filed: Aug. 25, 1978

[51] Int. Cl.$^2$ .................... A01G 25/00; C02C 5/00
[52] U.S. Cl. .................................... 405/36; 210/170; 239/177; 405/128
[58] Field of Search .................. 405/36, 43, 128; 210/170; 239/177, 212

[56] References Cited

U.S. PATENT DOCUMENTS

| | | | |
|---|---|---|---|
| 3,921,908 | 11/1975 | Zimmerer | 239/177 |
| 4,011,990 | 3/1977 | Meis et al. | 239/177 |

OTHER PUBLICATIONS

"Land Treatment of Food Processing Wastewaters"; Journal of the Irrigation and Drainage Division, Asce, vol. 99, No. IR3, 9/73 pp. 339–352—An Article By L. C. Gilde.
"Land Treatment and Disposal of Food Processing Wastes"; Land Application of Waste Materials—Soil Conservation of America, Ankeny, Iowa 50021, 1976; a paper by Hunt, Gilde and Francingues.
"Food Processing Wastewater Disposal by Irrigation'-'—University of Guelph, Food Production-Wastewater Disposal Symposium, 4/1977–Guelph, Ontario, Canada, paper by L. C. Gilde.
"Valley Corner System," Brochure by Valmont Industries, Inc. Valley, Nebraska 68064, 1975.
"Waste Water Treatment Through Land Application" Brochure by Reynolds Metal Co, Richmond, Va.—1977.

*Primary Examiner*—Alexander Grosz
*Attorney, Agent, or Firm*—Howson & Howson

[57] ABSTRACT

A wastewater treatment system of the overland flow type for use with land having impervious or relatively impervious soil comprises a circular land area formed in a succession of concentric annular terraces. The terraces are planted with a grass crop compatible with heavy irrigation, and each terrace slopes radially toward an adjacent annular drain concentric therewith. A rotary distribution system pivoted at the center of the terraces is rotated at a predetermined speed to distribute the wastewater over the terraces.

26 Claims, 11 Drawing Figures

WASTEWATER TREATMENT SYSTEM

BACKGROUND OF THE INVENTION

The present invention relates generally to wastewater treatment systems and relates more particularly to a novel overland flow type treatment system.

The overland flow treatment of wastewater involves the application of the wastewater to a sloping terrace of impervious or relatively impervious soil which is planted in a grass crop compatible with heavy irrigation. The wastewater flows in a thin film over the surface of the terrace and becomes purified upon flowing slowly through the grasses and the soil surface by biodegradation of the organic impurities by the soil microorganisms and/or chemical-mechanical removal of inorganics by the soil complex. Since the soil is impervious or relatively impervious, a large percentage of the wastewater is collected as runoff in substantially purified form with the remainder being absorbed into the soil, consumed by the plant life, or evaporated into the atmosphere. The overland treatment is particularly well adapted for the disposal of food processing wastewater containing large amounts of organic materials or other similar types of wastewaters including most municipal sewage wastewaters. The employment of overland flow systems has been pioneered by Campbell Soup Company plants, including those having heavy seasonal wastewater flows such as tomato processing plants.

The overland flow treatment is conventionally carried out utilizing natural hill sites, although in most cases, the sites are modified to produce a satisfactorily uniform slope of between 2% and 8% and a smooth surface to prevent the channeling of the water flow. The wastewater is applied to the hillside in a conventional overland irrigation system by fixed conduits or laterals which typically comprise pipes lying on the surface or below the surface of the slope and having rotating sprinkler heads located at intervals along the conduits or laterals and arranged to spray the wastewater predominantly on the upper regions of each slope. The wastewater is permitted to flow along the slope surface for a distance of approximately 175-250 feet and is then collected by suitable drains and either recycled or directed into a local stream or river.

The conventional overland flow system as briefly described has been extremely successful and the present invention utilizes the proven overland flow principles including the distribution of the wastewater to carefully graded slopes, the passage of the wastewater across the grass covered slope surfaces and the collection of the purified water at the bottom of the slopes. The present invention differs primarily in the manner in which the slopes are formed and the manner in which the wastewater is distributed to the slopes.

The overland flow system although economical to operate can be initially quite expensive to develop, primarily because of the work required to reform the natural contours of the earth in the selected area and the high cost of installing the fixed wastewater distribution system. The slopes must be uniformly graded to prevent puddling, channeling and erosion and to provide the desired retention time of the water. With natural slopes, it may not be possible to use all of the available land due to natural terrain irregularities. Although tiers of terraces can in some cases be provided on an appropriately sloping hillside, the more usual situation is a single flow area on a given hillside utilizing the optimally sloping portion to receive the wastewater flow.

SUMMARY OF THE INVENTION

In the present overland system, the wastewater is applied to a circular treatment zone comprising a circular surface area of land having impervious or relatively impervious soil. The treatment zone is formed into a series of concentric annular terraces, each of the terraces sloping toward a concentric annular drain. The terraces are planted in a grass crop compatible with heavy irrigation such as reed canary grass. A rotary distribution system pivoted at the center of the terraces is rotated at a predetermined speed to distribute the wastewater over the terraces.

Although the formation of the terraces requires a certain amount of earth moving and grading, the cost is comparable to that of reforming a natural hill slope to the required uniformity. With the present circular treatment zone, the entire area within the zone can be utilized for overland flow and the system can be employed in completely flat or relatively flat land areas. Substantial economies are realized with the present system in comparison with a conventional overland flow system in the cost of the wastewater distribution system since the rotary system is considerably less expensive to install and maintain than a fixed conduit irrigation system.

It is accordingly a first object of the present invention to provide an overland flow wastewater treatment system which may be built and maintained at a relatively low cost.

A further object of the invention is to provide an overland flow wastewater treatment system which may be established on level ground with a minimal amount of soil displacement required in its construction.

Another object of the invention is to provide an overland flow wastewater treatment system as described which provides better utilization of the land area required as a treatment zone thereby providing a significant increase in land use efficiency in comparison with most conventional overland flow systems.

Additional objects and advantages of the invention will be more readily apparent from the following detailed description of specific embodiments thereof.

DESCRIPTION OF THE PREFERRED EMBODIMENTS

Figure 1:
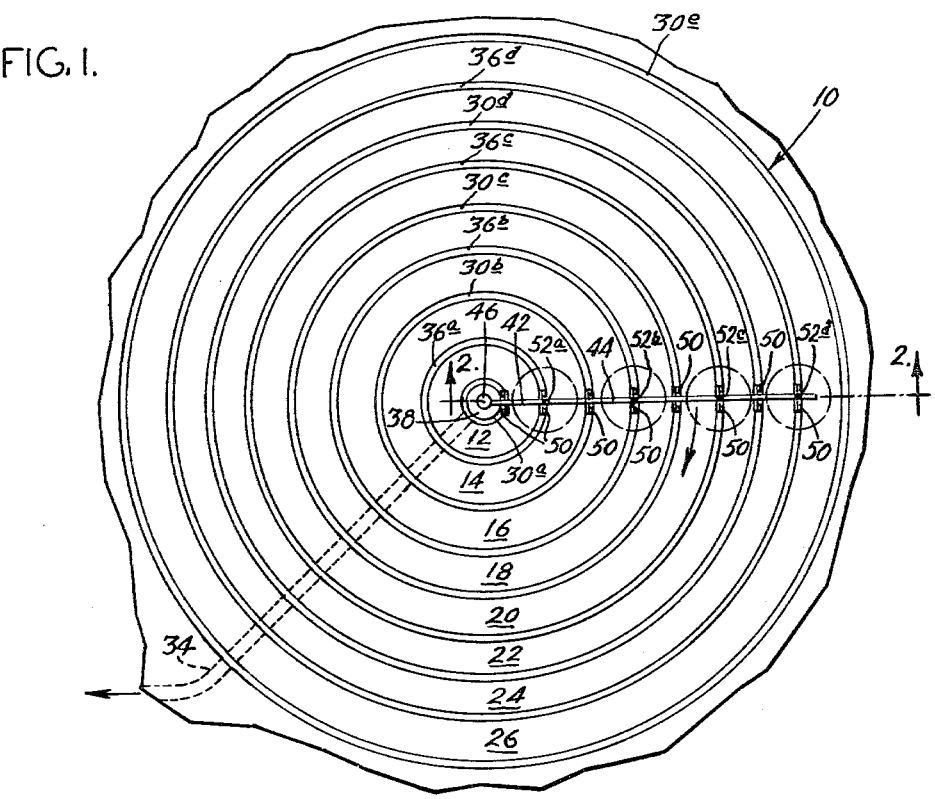
FIG. 1 is a plan view of an overland flow wastewater treatment system embodying the present invention.

Referring to the drawings and particularly FIGS. 1-4 thereof, an overland flow wastewater system in accordance with the present invention comprises a circular land surface area comprising a treatment zone which is generally designated 10 as shown in FIG. 1. Although the size of the treatment zone may vary depending upon the amount of wastewater to be treated, in a typical system the radius of the treatment zone might be one quarter of a mile and accordingly encompass an area of approximately 120 acres. The system is intended for use in land areas having an impervious or relatively impervious soil or wherever deep percolation is restricted. This could include sand on clay, clay on sand, etc. The treatment zone 10 should accordingly be located in such a land area.

Figure 2:
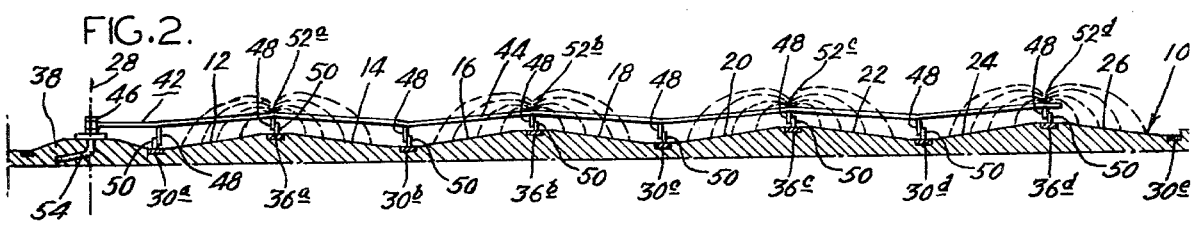
FIG. 2 is an enlarged sectional view taken along line 2—2 of FIG. 1.
Figure 3:
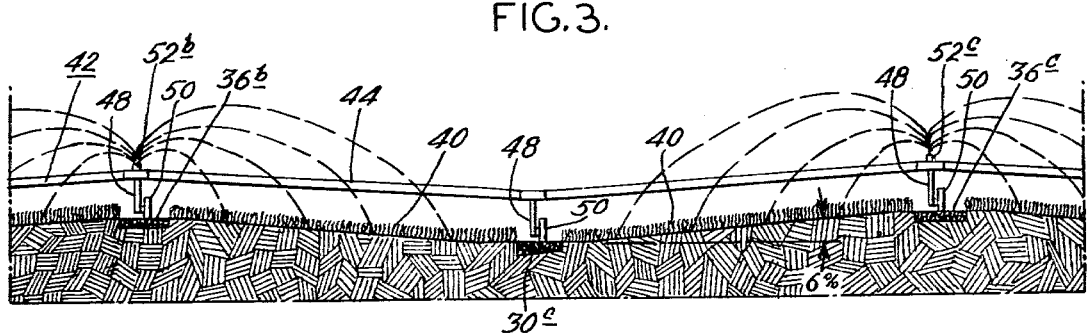
FIG. 3 is an enlarged portion of the view of FIG. 2.
Figure 4:
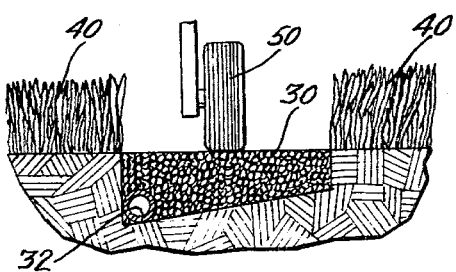
FIG. 4 is an enlarged sectional view showing details of one of the valley drains.

As shown in FIG. 2, the treatment zone 10 is graded so as to form a series of concentric annular terraces 12, 14, 16, 18, 20, 22, 24 and 26. The terraces each have a smoothly graded radial slope of between 2% and 8% with a typical installation having a slope of 6% as illustrated in FIG. 3. In the preferred embodiments of the invention, the terraces slope alternately toward and away from the center 28 of the treatment zone so that terraces 12, 16, 20 and 24 slope radially inwardly toward the center of the zone while terraces 14, 18, 22 and 26 slope radially outwardly away from the center of the zone. The described terrace configuration accordingly produces an alternate series of ridges and valleys, a typical enlarged cross section of which is shown in FIG. 3. In each of the valleys thus formed, a drain 30 is provided which as illustrated in FIG. 4 may be a gravel drain and include a perforated drain conduit 32, or may be of any other suitable drain construction.

Each of the drains 30 is identical and in FIGS. 1 and 2 are accordingly identified with the suffixed letters a-e to identify their location, the drain 30a being located closest to the center of the treatment zone while the drain 30e is located at its periphery. As shown in FIG. 1, the drains each have an annular plan configuration so as to receive the purified wastewater flowing from the adjacent terraces. In this respect, the drain 30a will receive the flow from terrace 12, drain 30b will receive the flow from terraces 14 and 16, drain 30c from terraces 18 and 20, drain 30d from terraces 22 and 24, and drain 30e from terrace 26. As shown in FIG. 1, the drains 30a-e connect with a main radial drain 24 passing therebeneath which conducts the purified wastewater either to a holding tank or lagoon for recycling or to a stream or river into which it is released. Although a single radial drain is shown, additional radial drains could be employed if desired. It will be evident that the drains 30a-e should slope slightly toward the main drain 34. This will necessitate the grading of the gravel drains 30 and the drain conduits 32 in such a fashion that each of the annular drains 30a-e intersects the radial main drain 34 at its low point. Normally a land area will not be entirely level and the main drain 34 would thus most readily be directed radially outwardly in the direction of the lowest point of the treatment zone. However, the drain 34 may lead to any convenient location depending upon desired use or discharge of the treated effluent.

Along each ridge formed by the sloping terraces is an annular ridge road or track 36 formed of gravel or other material suitable for service as a roadway to support the weight of the rotary distributor described herebelow. Accordingly, a track 36a is provided along the ridge formed by terraces 12 and 14, track 36b along the ridge formed by terraces 16 and 18, track 36c along the ridge formed by terraces 20 and 22, and track 36d along the ridge formed by terraces 24 and 26.

A circular section 38 of the land surface at the center of the treatment zone 10 bounded at its periphery by the drain 30a slopes up to the center to provide a level foundation for mounting the rotary distribution system pivot as described below. The diameter of the section 38 is too small to be formed into a terrace configuration, and is a very small fraction of the total treatment zone 10.

The surfaces of the terraces are planted with a grass crop 40 compatible with heavy irrigation and the grass crop extends across the entire area of each terrace from the ridge road to the drain which define the circular terrace edges. Although the type of grass utilized will depend upon the nature of the wastewater to be treated as well as the climate of the region in which the treating zone is located, certain water-tolerant grasses and blends of grasses have proven to be especially well adapted for overland flow treatment of wastewater and these grasses or a blend thereof are the preferred grass crop to be planted on the terraces. The preferred grasses include reed canary grass, seaside bentgrass, red-top, tall-fescue and common bermudagrass although other water-tolerant grasses or cover crops may be equally suitable.

A rotary distribution means generally designated 42 is provided for applying wastewater to the terraces in a substantially uniform manner. In the embodiment of FIGS. 1-4, the rotary distribution means comprises a radially extending wastewater delivery conduit 44 which is pivotally secured at the center 28 of the annular terraces by a pivot hub 46 anchored in the land section 38 as shown in FIG. 2. The conduit 44, which might typically comprise a large diameter steel or aluminum pipe, is supported in spaced relation above the terraces by towers 48 located at each of the ridge roads 36 and also at each of the valley drains 30. The towers 48 as schematically shown in FIG. 1 each ride on a pair of wheel assemblies 50 which are arranged to track along the ridge roads and valley drains, the drains serving the dual purpose of collecting the purified wastewater runoff as well as supporting the alternate conduit support towers.

Sprinker heads 52 are mounted on the conduit 44 directly over the ridges formed by the sloping terraces and are set to provide a spray delivery of wastewater onto the terraces which as illustrated in FIGS. 1-3 is directed predominately onto the upper portion of each terrace with approximately 85% of each terrace being subject to the spray and 15% of the terrace area adjacent the drain receiving wastewater only as a flow from the upper terrace region.

Although the rotary distribution means 42 is shown somewhat schematically in the drawings, the device is structurally quite similar to the center pivot irrigation systems which have been employed in recent years to spray irrigate agricultural tracts which generally range in size from between 100 to 200 acres for each pivot system. Such systems are commercially available from several manufacturers and could readily be adapted to carry out the wastewater distribution function of the present invention, the primary modification required being the modification of the spray application areas and the rates of application of the water. In view of the well established commercial availability of pivot distribution systems, the details of the system have not been illustrated. Means are provided for rotating the conduit 44 at a predetermined speed, such means conventionally comprising electric motor or hydraulic drives for the support tower wheels. The conduit may either be continuously rotated in the same direction or its movement may be reversed periodically so as to repeatedly traverse a given sector of the treatment zone. In view of the tremendous length of the conduit 44, it is customary to provide control devices for the motor drives which maintain the straight radial alignment of the conduit to prevent bending which might cause conduit rupture. Although the conduit 44 forms the backbone of the pivot distribution system it is necessary and customary to provide stiffening means for the conduit in the form of bracing stays and struts (not shown) extending between the support towers.

The wastewater is supplied to the conduit 44 from underground and enters the conduit through the hub 46 as shown at 54 in FIG. 2. The wastewater is pumped into conduit 44 at a predetermined pressure to produce the desired spray pattern from the sprinkler heads 52.

Although the dimensions of the system could be varied with satisfactory results, in the presently preferred system the width of the annular terraces is approximately 150 feet between the ridge roads and the valley drains. The spray heads are preferably located at a convenient location above the ridge roads, for example 8 feet, and are adjusted to direct a spray over approximately the upper 125 feet of each of the adjacent terraces. The slope of the terraces should be a minimum of 2% and a maximum of 8% to provide the desired retention time of the wastewater on the terraces. The grading of the terraces to a uniform sloping configuration is accordingly important since any deviations from a smooth slope will result in either a puddling of the wastewater or a channeling of the water, either condition preventing the desired slow moving of a thin film of water through the terrace grass crop. The purification of the wastewater as is well known in overland flow treatment is achieved through biodegradation of the organic impurities by the grass and soil microorganisms and/or chemical-mechanical removal of inorganics by the soil complex.

For operation of the system, it should be ascertained that the grass crop 40 has become well established over the entire surface of the terraces. Normally, it would be expected that the grass crop has been properly sown and fertilized and has undergone several cuttings to establish a thick ground cover onto which the wastewater can be sprayed without the risk of soil erosion. With the operating pressure established under which the wastewater is pumped into the conduit 44, the spray nozzles 52 are adjusted to supply the desired spray pattern to the terraces and to supply a quantity of wastewater to each terrace in proportion to the circumferential length of the terrace. Since the width of the terraces is the same throughout the treatment zone, it will be apparent that the area to be sprayed by each spray head in the course of one complete revolution of the conduit 44 will be directly proportional to the radial distance the spray head is located from the center 26 of the treatment zone 10. As a result, the spray head 52d will have to have a substantially larger capacity than the spray head 52a since it will be traversing roughly four times the terrace area. The conduit 44 is slowly rotated at a predetermined rate which might typically produce one, two or more revolutions around the treatment zone per day.

In an overland flow system, the practical limits of application of the wastewater to the terraces has been found to be a rate of approximately 1 inch in five hours and the application should not continue more than eight hours a day although this can be broken up into several applications. Since these maximun limits permit a substantial flow of wastewater each day onto the terraces, it can be appreciated that with the system shown in FIGS. 1-4 a limiting factor could be the permissible delivery rate at the outermost sprinkler head 52d. Too fast a delivery could produce a stream-like flow of water across the terrace surfaces rather than the desired thin film flow described above. For this reason, the embodiment of FIGS. 1-4 may not be entirely suitable for all types of wastewaters and may not be able to take advantage of the full capacity of a large diameter treatment zone. For this reason, modified embodiments of the invention are shown in FIGS. 5-7 and in FIGS. 8 and 9 wherein a rotary distribution means includes means for substantially equalizing the duration of the periods of application of the wastewater onto the several terraces.

Figure 5:
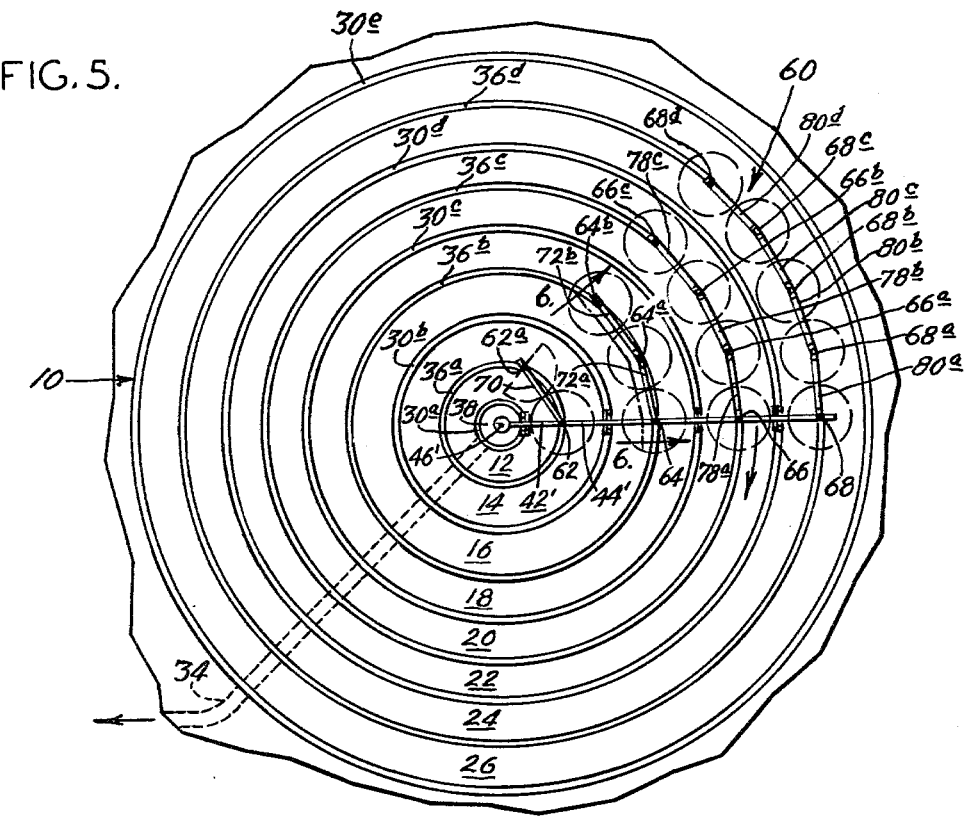
FIG. 5 is a plan view of a modified form of the invention.
Figure 6:
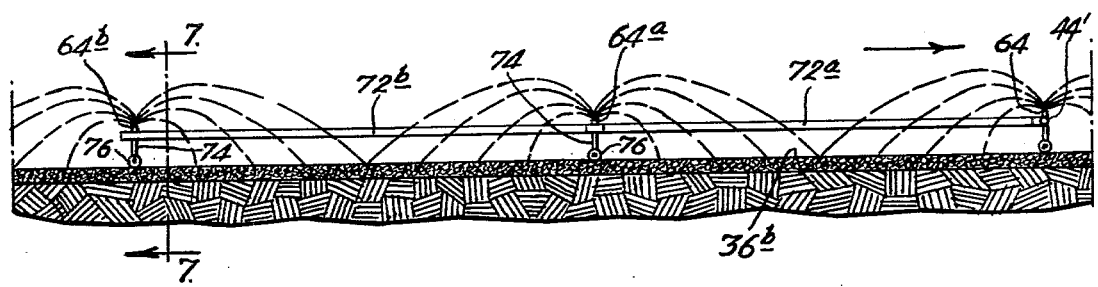
FIG. 6 is an enlarged sectional view taken along line 6—6 of FIG. 5.
Figure 7:
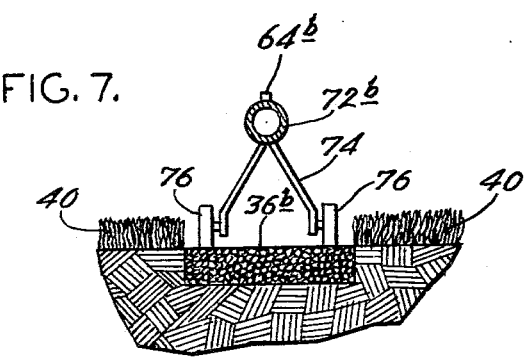
FIG. 7 is an enlarged sectional view taken along line 7—7 of FIG. 6.

Considering the details of the embodiment of FIGS. 5-7, the terraced treatment zone 10 is identical with the embodiment of FIGS. 1-4 and accordingly the elements thereof bear the same identifying numerals. The changes lie solely in the construction of the rotary distribution means 42' which comprises a radial conduit 44' extending from a central pivot hub 46'. The embodiment of FIGS. 5-7 differs from the previously described embodiment in that means are provided for applying the wastewater to a sector-shaped area of the treatment zone. This is accomplished by means of a sector-shaped array of sprinkler heads generally designated 60 which are mounted on the conduit 44' and on trailing conduits attached thereto. Each of the sprinkler heads within the array 60 is adjusted to deliver substantially the same rate of wastewater and this arrangement will accordingly provide a uniformity of wastewater application and permit the full utilization of the capacity of the treatment zone without concern for exceeding the permissible flow rate onto the outermost terraces.

Considering the details of the sprinkler head array 60, sprinkler heads 62, 64, 66 and 68 are provided extending respectively from the conduit 44' above the treatment zone ridge roads 36a, 36b, 36c and 36d. Attached to the conduit 44' directly above the ridge road 36a is a trailing conduit 70, at the trailing end of which is mounted a sprinkler head 62a. The spray pattern of head 62a as illustrated in FIG. 5 is a semi-circular pattern approximately tangential to the spray pattern of the sprinkler head 62.

Extending from the conduit 44' immediately above the ridge road 36b is a trailing conduit assembly made up of a trailing conduit section 72a from which trails a further section 72b as shown in FIGS. 5 and 6. The conduits 72a and 72b are provided with sprinkler heads 64a and 64b, the spray patterns of which adjoin in succession adjacent that of head 64. The trailing conduits 70, 72a and 72b as well as those described below are supported as shown in FIG. 7 at spaced intervals by support leg assemblies 74 which include wheels 76 arranged to ride on the ridge roads 36.

Trailing conduits 78a, 78b and 78c extend from conduit 44' above ridge road 36c and carry sprinkler heads 66a, 66b and 66c in trailing succession therealong. Similarly, conduits 80a, 80b, 80c and 80d connected in linked succession are attached to conduit 44' above the ridge road 36d and have mounted thereon the sprinkler heads 68a, 68b, 68c and 68d.

Since the trailing conduits do not rotate horizontally with respect to the conduit 44' or with respect to each other, it may be desirable to include cross bracing in the form of connecting cables (not shown) to insure the correct alignment and support of the trailing conduits so that the wheels of the support assemblies remain on the ridge roads 36. Since there may be some slight undulations of the roads, some articulation of the trailing conduits and their connection with the conduit 44 should be provided to permit vertical relative movement of these components. In addition, stiffening means in the form of bracing stays and struts (not shown) are required for the trailing conduits.

The operation of the embodiment of FIGS. 5–7 is similar to that of the previously described embodiment, the entire array of sprinkler heads being moved clockwise at a predetermined speed around the treatment zone to effect both a uniform delivery rate of wastewater over each of the terraces as well as substantially uniform duration of application of the wastewater. This embodiment will accordingly permit a more uniform water delivery to the treatment zone than that of the embodiment of FIGS. 1–4 wherein the rate of application of the wastewater to the outermost terrace would of necessity be substantially faster than that to the innermost terraces, while the duration of application would be considerably shorter. The direction of movement of the distribution system of the FIGS. 5–7 embodiment cannot be reversed due to the presence of the trailing conduits.

The angular length of the sector-shaped array 60 of sprinkler heads is selected in accordance with the desired duration of spray. For example, if the conduit 44' is driven at a rate producing one complete revolution of the treatment zone per day, a 45° sector angle would produce a three hour per day application duration. A larger angle would produce a proportionately longer spray duration, whereas a smaller angle would produce a shorter spray duration.

Figure 8:
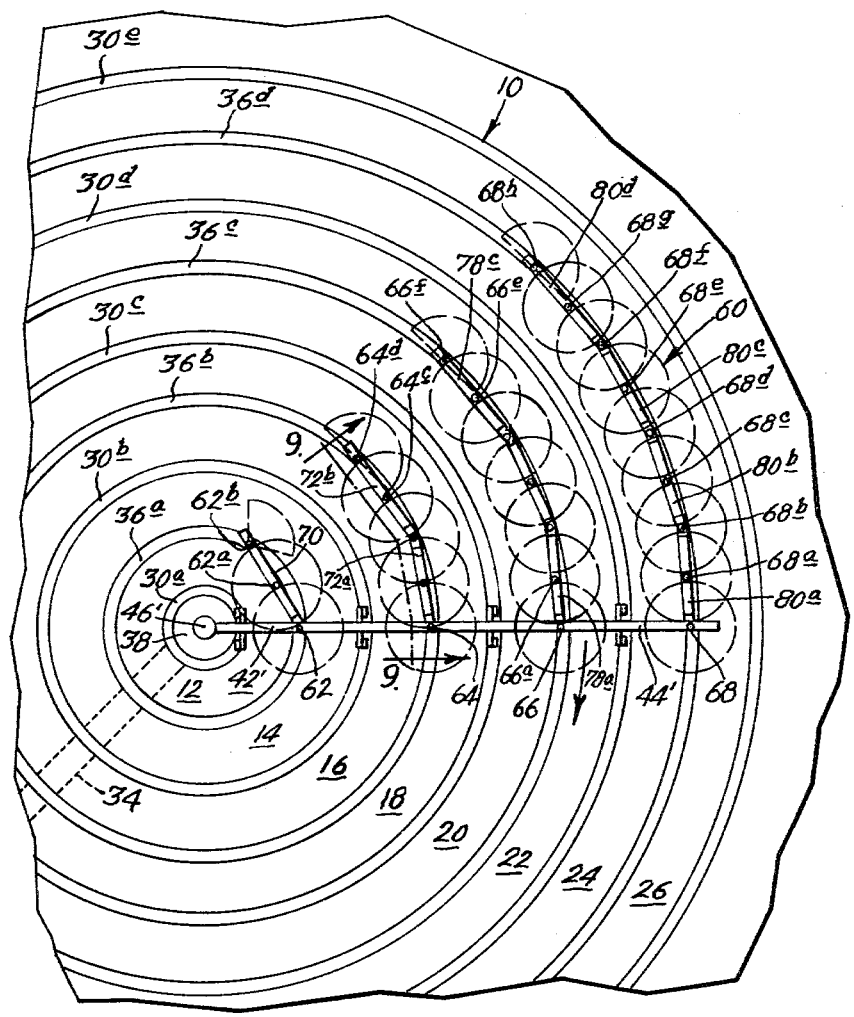
FIG. 8 is a plan view of a further modified form of the invention.
Figure 9:
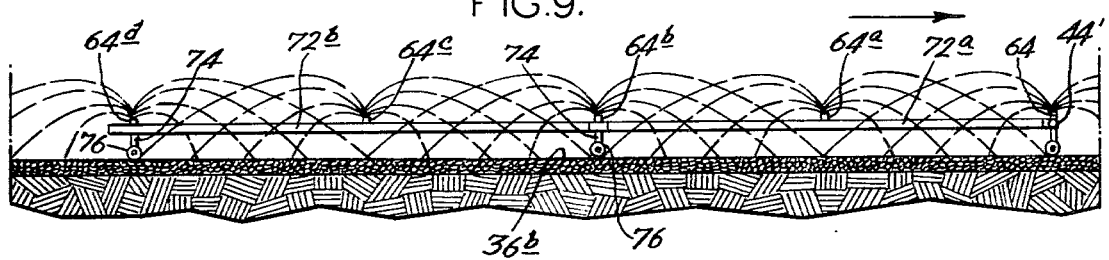
FIG. 9 is an enlarged sectional view taken along line 9—9 of FIG. 8.

In FIGS. 8 and 9, a further embodiment of the invention is illustrated which is quite similar to the embodiment of FIGS. 5–7 and which accordingly bears the same identifying numerals. The FIGS. 8 and 9 embodiment differs in two respects: the number of sprinkler heads on each of the trailing conduits is increased, resulting in an overlap of the wastewater spray patterns of adjoining heads; and at least one sprinkler head on each trailing boom is set so as to direct wastewater only onto the radially outermost adjoining terrace. In the illustrated embodiment, the last head on each trailing conduit (62b, 64d, 66f and 68h) sprays only the outermost terrace. This latter arrangement compensates for the greater area of the outermost of the pair of terraces irrigated by the sprinkler heads of each trailing conduit. Depending on a number of variables, such as the output of each sprinkler head, the radius of the particular terrace, pressure drop in the conduits, etc., the total number of sprinkler heads and the number and angular spray pattern of the heads directed only to the outermost terrace may vary from that illustrated.

Figure 10:
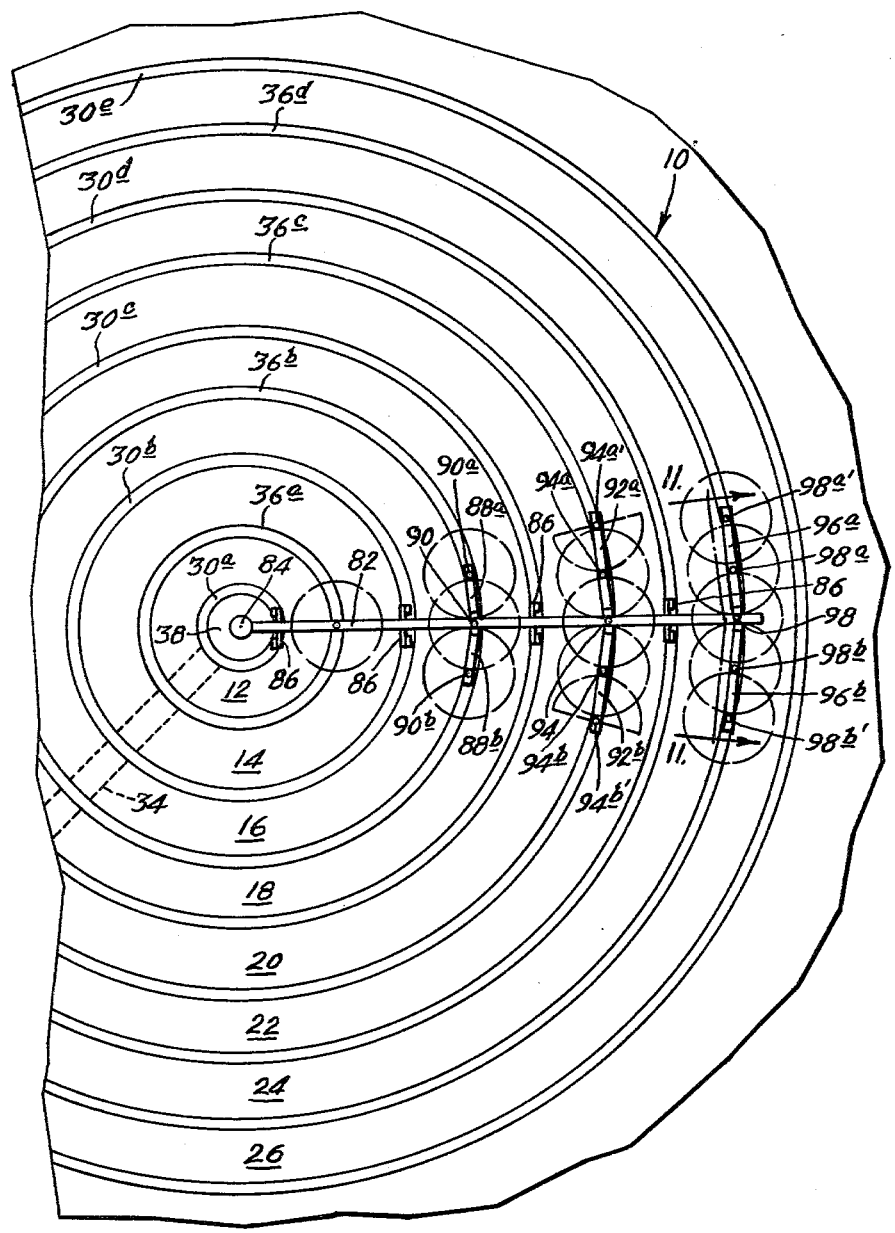
FIG. 10 is a plan view of a still further modified form of the invention.
Figure 11:
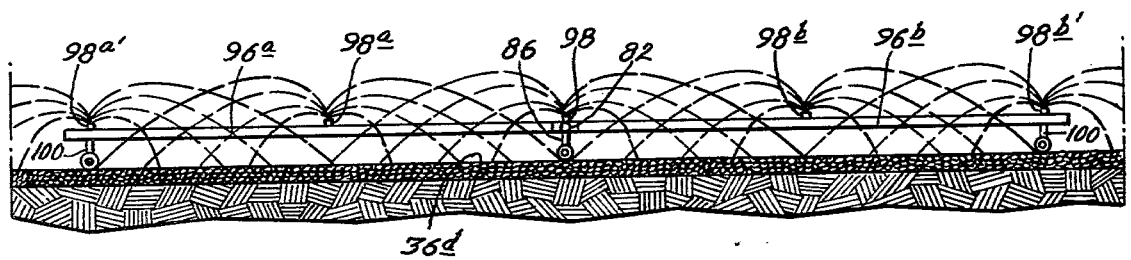
FIG. 11 is an enlarged sectional view taken along line 11—11 of FIG. 10.

In the embodiment of FIGS. 10 and 11, the treatment zone 10 is identical to that of the previous embodiments and the elements thereof thus bear the same identifying numerals. The wastewater distribution means differs somewhat to permit the reversing movement of the distributor as permissible with the FIGS. 1–4 embodiment while providing a sector-shaped array of sprinkler heads as in the FIGS. 5–7 and 8–9 embodiments.

The distributor of the FIGS. 10 and 11 embodiment includes a radially extending conduit 82 pivotally secured at the terrace center 38 by pivot hub 84. The conduit 82 is pivotally supported on wheeled towers 86 located at the ridge roads and valley drains. Means are provided for rotating the conduit 82 in either direction around the terraces. The sector-shaped array of sprinkler heads is mounted on the conduit 82 and on auxiliary conduits extending from each side thereof over the outer ridge roads.

A single sprinkler head is located on the conduit 82 over the ridge road 36a. Over road 36b, auxiliary conduits 88a and 88b extend respectively from opposite sides of the conduit 82. A sprinkler head 90 is located on conduit 82 directly above road 36b, and sprinkler heads 90a and 90b are located at the respective ends of auxiliary conduits 88a and 88b.

Similarly, over road 36c a pair of auxiliary conduits 92a and 92b of a greater length than conduits 88a and 88b extend from opposite sides of the conduit 82. A sprinkler head 94 is located on conduit 82 directly over the road 36c, and sprinkler heads 94a and 94b are located halfway out on the auxiliary conduits 92a and 92b respectively. At the ends of the auxiliary conduits 92a and 92b are respectively mounted the sprinkler heads 94a' and 94b' which are adjusted to spray only a 180° sector directed toward the conduit 82 as illustrated.

Over road 36d, auxiliary conduits 96a and 96b having the same length as conduits 92a and 92b extend from conduit 82. A sprinkler head 98 is located on conduit 82 over road 36d, sprinkler heads 98a and 98b are respectively located at the midpoints of conduits 96a and 96b, and sprinkler heads 98a' and 98b' are respectively located at the ends of conduits 96a and 96b.

As shown in FIG. 11, the auxiliary conduits 96a and 96b (as well as the auxiliary conduits 88a, 99b, 92a and 92b) are each supported by a double wheeled support assembly 100 disposed near the end thereof and adapted to track around the underlying ridge road. The auxiliary conduits are rigidly secured to the conduit 82 by means of cables or other means (not shown) to maintain the alignment of the auxiliary conduits over the ridge roads. The conduit 82 and auxiliary conduits extending therefrom may be rotated in either direction without disturbing the alignment of the auxiliary conduits.

For operation of the FIGS. 10 and 11 embodiment, the conduit 82 is rotated around the terraces at a speed coordinated with the sprinkler head delivery rate to give the desired rate of wastewater application. The direction of rotation may, if desired, be periodically reversed to permit the distributor to operate for a predetermined period over only a sector of the treatment, for example a 90° sector.

As the wastewater flows down the sloping terraces of each of the described embodiments of the invention, a certain fraction will be consumed by the grass crop and an additional amount will be lost by evaporation to the atmosphere. A small amount will in addition be lost into the soil even though relatively impervious. In a typical system, it can be expected that approximately 50% (varies with crops, transportation and soil conditions) of the wastewater will be recovered from the drain system flowing into the main drain 34 from the annular drains 30 and the recovered water can either be recycled for its original use, used for other cash crops, etc., or returned to the local watershed by delivery to a stream, river, or receiving water body.

The mowing of the terraces and the removal of the cut grass crop may be readily effected with the present annular terrace system since there are no surface impediments on the terraces in contrast to the fixed conduit overland flow systems wherein the conduits and sprinkler heads must be avoided. The height of the rotary distribution means should permit tractors, etc. to pass therebeneath, or, if not, can simply be rotated out of the work area.

Although the invention has been described in terms of terraces which alternately slope toward and away from the center of the treatment zone, it will be apparent that under appropriate geographical conditions, the terrain may permit the terraces to ascend or descend in a tiered fashion with some or all of the terraces sloping in the same direction. Such a system most likely would be restricted to a rather small size layout considering the unlikely discovery of a natural site having the necessary slope characteristics.

The details of the wastewater distribution system have been shown relatively schematically since it is obvious that alternate arrangements could prove equally satisfactory. The roads for example could be paved or if desired could constitute tracks on which the conduits could ride. Similarly, the drain system could be modified as desired; for example, more than one radial drain could be utilized to intercept the annular drains.

From the foregoing, it can be understood that the present invention provides a relatively low cost overland flow system for wastewater treatment. The use of the rotary wastewater distribution means greatly reduces the initial cost of the system and the efficient use of the land area which results from the concentric terrace arrangement provides an added economic advantage.

Manifestly, changes in details of construction can be effected by those skilled in the art without departing from the spirit and scope of the invention.

I claim:

1. An overland flow wastewater treatment system comprising a treatment zone comprising a circular land surface area having impervious or relatively impervious soil, said land surface area comprising a plurality of concentric annular terraces, each of said terraces sloping gradually radially toward a concentric adjoining annular drain said terraces sloping alternately radially inwardly and radially outwardly, thereby creating a series of annular ridges and valleys in said treatment zone, a water-tolerant grass crop growing on said terraces, distribution means for applying wastewater to said terraces, said distribution means comprising a radially extending conduit pivotally secured at the center of said annular terraces and adapted for movement around said treatment zone, means for delivering wastewater under pressure to said conduit, and means on said conduit for distributing a substantially uniform quantity of wastewater to the grass crop on each of said terraces, the gradual slope of each of said terraces providing a slow movement of the wastewater through the grass crop toward the adjoining drain.

2. The invention as claimed in claim 1 wherein each of said terraces has a uniform radial slope of between 2% and 8%.

3. The invention as claimed in claim 1 including an annular drain in each of said valleys, and a radially extending main drain intersecting said annular drains to collect the flow therefrom.

4. The invention as claimed in claim 1 including an annular road on each of said ridges and in each of said valleys, and wheeled support means extending from said radially extending conduit adapted to roll on said ridge and valley roads.

5. The invention as claimed in claim 1 wherein said means on said conduit for distributing a substantially uniform quantity of wastewater to the grass crop on each of said terraces comprises a plurality of sprinkler heads on said radially extending conduit, each of said sprinkler heads serving to deliver wastewater at a rate proportional to the radius of the adjacent terrace.

6. The invention as claimed in claim 5 wherein said sprinkler heads direct a spray of wastewater over the upper 85% of each terrace.

7. The invention as claimed in claim 1 including means for providing a substantially uniform duration of wastewater delivery to each of said terraces.

8. The invention as claimed in claim 7 wherein said means for providing a substantially uniform duration of wastewater delivery comprises trailing conduits extending from said radially extending conduit, and a sector-shaped array of sprinkler heads on said radially extending conduit and trailing conduits.

9. The invention as claimed in claim 8 wherein at least one of said sprinkler heads on each said trailing conduit is arranged to deliver wastewater only onto the radially outermost adjoining terrace to compensate for the greater land area encompassed thereby.

10. An overland flow wastewater treatment system comprising a treatment zone comprising a circular land surface area having impervious or relatively impervious soil, said land surface area comprising a plurality of concentric annular terraces, each of said terraces sloping radially toward a concentric adjoining annular drain, the slope of each said terrace comprising a uniform slope of between 2% and 8%, said terraces sloping alternately radially inwardly and radially outwardly thereby creating a series of annular ridges and valleys in said treatment zone, a water-tolerant grass crop growing on said terraces, an annular road on each of said ridges and in each of said valleys, a rotary distribution means for cyclically applying wastewater to said terraces, said rotary distribution means comprising a radially extending conduit pivotally secured at the center of said annular terraces and adapted for rotation at a predetermined speed around said treatment zone, wheeled support means extending from said radially extending conduit adapted to roll on said ridge and valley roads, means for delivering wastewater under pressure to said conduit, and means on said conduit for distributing a substantially uniform quantity of wastewater to the grass crop on each of said terraces, said latter means comprising a plurality of sprinkler heads located at spaced intervals on said radially extending conduit, each of said sprinkler heads serving to deliver wastewater at a rate proportional to the radius of the adjacent terrace, the wastewater distributed on each said terrace flowing slowly through the grass crop toward the adjoining drain.

11. The invention as claimed in claim 10 wherein said sprinkler heads direct a spray of wastewater over the upper 85% of each terrace.

12. The invention as claimed in claim 11 wherein an annular drain is located in each said valley.

13. The invention as claimed in claim 12 wherein the surface of each said annular drain serves as the valley road for that valley.

14. The invention as claimed in claim 13 including a radially extending main drain intersecting each of said annular drains to collect the flow therefrom.

15. An overland flow wastewater treatment system comprising a treatment zone comprising a circular land surface area having impervious or relatively impervious soil, said land surface area comprising a plurality of concentric annular terraces, each of said terraces sloping radially toward a concentric adjoining annular drain, the slope of each said terrace comprising a uniform slope of between 2% and 8%, said terraces sloping alternately radially inwardly and radially outwardly thereby creating a series of annular ridges and valleys in said treatment zone, a water-tolerant grass crop growing on said terraces, an annular road on each of said ridges and in each of said valleys, a rotary distribution means for cyclically applying wastewater to said terraces, said rotary distribution means comprising a radially extending conduit pivotally secured at the center of said annular terrace and adapted for rotation at a predetermined speed around said treatment zone, wheeled support means extending from said radially extending conduit adapted to roll on said ridge and valley roads, means for delivering wastewater under pressure to said conduit, and means on said conduit for distributing a substantially uniform quantity of wastewater to the grass crop on each of said terraces at a substantially uniform rate, said latter means comprising a plurality of trailing conduits extending from said radially extending conduit, said trailing conduits being located above said ridge roads and having wheeled support means adapted to ride on said ridge roads, and a sector-shaped array of sprinkler heads on said radially extending conduit and said trailing conduits, the length of each said trailing conduit and the number of sprinkler heads on each said trailing conduit being substantially proportional to the area of the terraces irrigated by that trailing conduit, the wastewater distributed on each said terrace flowing slowly through the grass crop toward the adjoining drain.

16. The invention as claimed in claim 15 wherein said sprinkler heads direct a spray of wastewater over the upper 85% of each terrace.

17. The invention as claimed in claim 16 wherein an annular drain is located in each said valley.

18. The invention as claimed in claim 17 wherein the surface of each annular drain serves as the valley road for that valley.

19. The invention as claimed in claim 18 including a radially extending main drain intersecting each of said annular drains to collect the flow therefrom.

20. The invention as claimed in claim 18 wherein the wastewater spray patterns of adjoining sprinkler heads on each said trailing conduit overlap.

21. The invention as claimed in claim 16 wherein at least one of said sprinkler heads on each said trailing conduit is arranged to deliver wastewater only onto the radially outermost adjoining terrace to compensate for the greater land area encompassed thereby.

22. An overland flow wastewater treatment system comprising a treatment zone comprising a circular land surface area having impervious or relatively impervious soil, said land surface area comprising a plurality of concentric annular terraces, each of said terraces sloping gradually radially toward a concentric adjoining annular drain said terraces sloping alternately radially inwardly and radially outwardly, thereby creating a series of annular ridges and valleys in said treatment zone, a water-tolerant grass crop growing on said terraces, distribution means for applying wastewater to said terraces, said distribution means comprising a radially extending conduit pivotally secured at the center of said annular terraces and adapted for movement around said treatment zone, means for delivering wastewater under pressure to said conduit, means on said conduit for distributing a substantially uniform quantity of wastewater to the grass crop on each of said terraces, means for providing a substantially uniform duration of wastewater delivery to each of said terraces, said latter means comprising auxiliary conduits extending from opposite sides of said radially extending conduit, and a sector-shaped array of sprinkler heads on said radially extending conduit and said auxiliary conduits, the gradual slope of each of said terraces providing a slow movement of the wastewater through the grass crop toward the adjoining drain.

23. The invention as claimed in claim 22 wherein each of said terraces has a uniform radial slope of between 2% and 8%.

24. The invention as claimed in claim 23 including an annular drain in each of said valleys, and a radially extending main drain intersecting said annular drains to collect the flow therefrom.

25. The invention as claimed in claim 23 including an annular road on each of said ridges and in each of said valleys, and wheeled support means extending from said radially extending conduit and said auxiliary conduits adapted to roll on said ridge and valley roads.

26. The invention as claimed in claim 23 wherein said sprinkler heads direct a spray of wastewater over the upper 85% of each terrace.

* * * * *

UNITED STATES PATENT AND TRADEMARK OFFICE
CERTIFICATE OF CORRECTION

PATENT NO. : 4,184,789
DATED : January 22, 1980
INVENTOR(S) : Louis C. Gilde, Jr.

It is certified that error appears in the above-identified patent and that said Letters Patent are hereby corrected as shown below:

Column 3, line 49 "24" should read --34--.

Column 5, line 15 "system it" should read --system, it--.

Claim 12, line 1 "11" should read --10--.

Claim 14, line 1 "13" should read --12--.

Claim 17, line 1 "16" should read --15--.

Claim 19, line 1 "18" should read --17--.

Claim 20, line 1 "18" should read --17--.

Claim 21, line 1 "16" should read --15--.

Claim 24, line 1 "23" should read --22--.

Claim 25, line 1 "23" should read --22--.

Claim 26, line 1 "23" should read --22--.

Signed and Sealed this

Twentieth Day of May 1980

[SEAL]

Attest:

SIDNEY A. DIAMOND

*Attesting Officer*     *Commissioner of Patents and Trademarks*